(12) United States Patent
Mizuno

(10) Patent No.: US 9,664,810 B2
(45) Date of Patent: May 30, 2017

(54) METHOD OF LOCATING THE POSITION OF LINEAR OBJECTS

(71) Applicant: TAKACHIHO SANGYO CO., LTD., Aichi-ken (JP)

(72) Inventor: Morio Mizuno, Nagoya (JP)

(73) Assignee: TAKACHIHO SANGYO CO., LTD., Aichi-ken (JP)

( * ) Notice: Subject to any disclaimer, the term of this patent is extended or adjusted under 35 U.S.C. 154(b) by 214 days.

(21) Appl. No.: 14/258,820

(22) Filed: Apr. 22, 2014

(65) Prior Publication Data

US 2014/0312904 A1 Oct. 23, 2014

(30) Foreign Application Priority Data

Apr. 23, 2013 (JP) .................................. 2013-090158

(51) Int. Cl.
*G01V 3/08* (2006.01)
*G01V 3/10* (2006.01)

(52) U.S. Cl.
CPC .................... *G01V 3/104* (2013.01)

(58) Field of Classification Search
CPC .......... G01V 3/15; G01V 3/081; G01V 3/102; G01V 3/101; E21B 47/02224
USPC ........................................ 324/326, 323, 327
See application file for complete search history.

(56) References Cited

U.S. PATENT DOCUMENTS

| 2,520,677 | A | * | 8/1950 | Fearon | ................. | G01R 33/022 |
| | | | | | | 324/253 |
| 3,617,865 | A | | 11/1971 | Hakata | | |
| 4,134,061 | A | * | 1/1979 | Gudgel | .................... | G01V 3/02 |
| | | | | | | 324/326 |
| 4,295,095 | A | * | 10/1981 | Thomas | .................... | G01V 3/06 |
| | | | | | | 324/326 |
| 4,314,251 | A | * | 2/1982 | Raab | ......................... | G01S 3/14 |
| | | | | | | 324/207.24 |
| 4,387,340 | A | | 6/1983 | Peterman | | |
| 4,427,950 | A | | 1/1984 | Akagiri et al. | | |

(Continued)

FOREIGN PATENT DOCUMENTS

| JP | 49-9388 | 3/1974 |
| JP | S57-22309 A | 2/1982 |

(Continued)

*Primary Examiner* — Tung X Nguyen
*Assistant Examiner* — Dominic Hawkins
(74) *Attorney, Agent, or Firm* — Christensen, Fonder, Dardi & Herbert PLLC

(57) ABSTRACT

A method of locating a position of a linear object, including arranging a first and a second reactor around a measuring point, the first reactor generating an induced voltage corresponding to an X-direction component of a magnetic field, the X direction perpendicular to a running direction of the object, and the second reactor generating an induced voltage corresponding to a Y-direction component of the field, the Y direction perpendicular to the X-direction and the running direction; obtaining a first reactor induced voltage and a second reactor induced voltage; setting an X-distance as a first distance from the point to the object center, and setting the Y-distance as a second distance; and estimating a direction in which the linear object is located as viewed from the point, by regarding an X-distance to Y-distance ratio as equal to a ratio of the first voltage to the second voltage multiplied by a coefficient.

5 Claims, 7 Drawing Sheets

(56) References Cited

U.S. PATENT DOCUMENTS

| | | | | |
|---|---|---|---|---|
| 6,242,907 B1 * | 6/2001 | Clymer | ............... | A61B 5/1121 |
| | | | | 324/207.17 |
| 6,407,550 B1 * | 6/2002 | Parakulam | ............... | G01V 3/15 |
| | | | | 324/326 |
| 6,815,953 B1 * | 11/2004 | Bigelow | ................. | G01V 3/12 |
| | | | | 324/329 |
| 7,120,564 B2 * | 10/2006 | Pacey | ...................... | G01V 3/08 |
| | | | | 340/854.8 |
| 7,733,077 B1 * | 6/2010 | Merewether | ........... | G01V 3/104 |
| | | | | 324/326 |
| 8,742,747 B2 * | 6/2014 | Pearson | ............... | G01R 33/123 |
| | | | | 324/67 |
| 2008/0142508 A1 * | 6/2008 | Jyousaka | ........... | G05D 23/1931 |
| | | | | 219/483 |
| 2011/0109437 A1 * | 5/2011 | Olsson | ..................... | G01V 3/15 |
| | | | | 340/8.1 |
| 2011/0191058 A1 * | 8/2011 | Nielsen | ............... | B65D 83/203 |
| | | | | 702/130 |
| 2013/0069922 A1 * | 3/2013 | Ueno | ................... | H04N 7/0132 |
| | | | | 345/204 |
| 2013/0127448 A1 * | 5/2013 | Hyacinthe | ............... | G01B 7/00 |
| | | | | 324/207.15 |

FOREIGN PATENT DOCUMENTS

| | | | |
|---|---|---|---|
| JP | 57-46517 | B2 | 10/1982 |
| JP | S63-313087 | A | 12/1988 |
| JP | 4-63350 | B2 | 10/1992 |
| JP | 8-33452 | B2 | 3/1996 |

\* cited by examiner

METHOD OF LOCATING THE POSITION OF LINEAR OBJECTS

CROSS-REFERENCE TO RELATED APPLICATIONS

This application claims priority to Japanese Patent Application No. 2013-090158 filed on Apr. 23, 2013, the disclosure of which is incorporated herein by reference.

FIELD OF THE INVENTION

The present invention relates to a method of locating the position of linear objects on the basis of the alternating field at the measurement point which is spaced from the linear object, the position of the linear object generating circumferential alternating field.

DESCRIPTION OF THE RELATED ART

In urban areas, there are many water pipes and power lines buried underground that constitute the lifeline of the city. Since such underground objects cannot be recognized by sight from above the ground, their location may often be lost or forgotten at the time of redevelopment. As such, before the actual construction of buildings in the city or other work involving excavation of the ground, it is necessary to examine whether there are any objects buried around the construction site that have been lost in order to prevent the buried objects from being accidentally damaged during the excavation. For detecting such buried objects, appropriate method including ultrasonic testing and ground penetrating radar may be selected.

When the buried objects to be located are transmission cables, water pipes or other generally linear objects that includes conductive materials, the electromagnetic line location method is generally selected for location of them. In electromagnetic line location, a underground linear object that generates an alternating magnetic field can be traced by sensing the alternating field at a number of measurement points above the ground. The circumferential alternating field may be generated around the linear object either by applying an alternating electric current to the linear object, or, if the linear object is a tube whose end is already known, by inserting an alternating field generator inside the tube from that end opening.

For example, Japanese Examined Patent Application Publication No. S57-046517 discloses a conventional technique which relates to electromagnetic line location method. The method of this art includes steps of vertically arranging a signal detecting coil and a synchronization signal detecting coil, and measuring the voltage (or electromotive force) induced by the circumferential alternating field around the underground cable. The underground cable is determined as located in the axial direction of the signal detection coil when a minimum induced voltage is obtained in the signal detection coil and a maximum voltage is obtained in the synchronous signal detection coil. It is possible to know the location and depth of the underground cable by examining the direction in which the underground cable exists from multiple measurement points on the ground.

SUMMARY OF THE INVENTION

In the conventional technique described in Publication No. S57-046517, however, the operator had to direct the detecting coils in several directions at each measurement point by trial and error for finding the direction in which the underground cable runs. Therefore, it is troublesome to determine the location and depth of the underground cable.

One aspect of the present invention provides a method of locating the position of a linear object on the basis of an alternating field located at a measuring point spaced away from the linear object, wherein a running direction of the linear object is known, and an alternating field is generated in the circumference, the method including:

arranging a first and a second reactor around the measuring point, the first reactor generating an induced voltage corresponding to an X-direction component of a magnetic field, the X direction being perpendicular to the running direction of the linear object, and the second reactor generating an induced voltage corresponding to a Y-direction component of the magnetic field, the Y direction being perpendicular both to the X-direction component and to the running direction of the linear object;

obtaining a first reactor voltage induced by the alternating field in the first reactor and a second reactor voltage induced by the alternating field in the second reactor;

setting an X-distance as a first distance from the measurement point to a center of the linear object, and setting the Y-distance as a second distance from the measurement point to the center of the linear object; and estimating a direction in which the linear object is located as viewed from the measurement point, by regarding a ratio of the X-distance to the Y-distance as equal to a ratio of the first reactor voltage to the second reactor voltage multiplied by a certain coefficient.

DETAILED DESCRIPTION OF THE INVENTION

Embodiments of the present invention will now be described with reference to the drawings. With regard to the steps associated to the invention, such as generating alternating current in the metal cable, and finding the running direction of the metal cable, their detailed descriptions are omitted in the followings.

Figure 1:
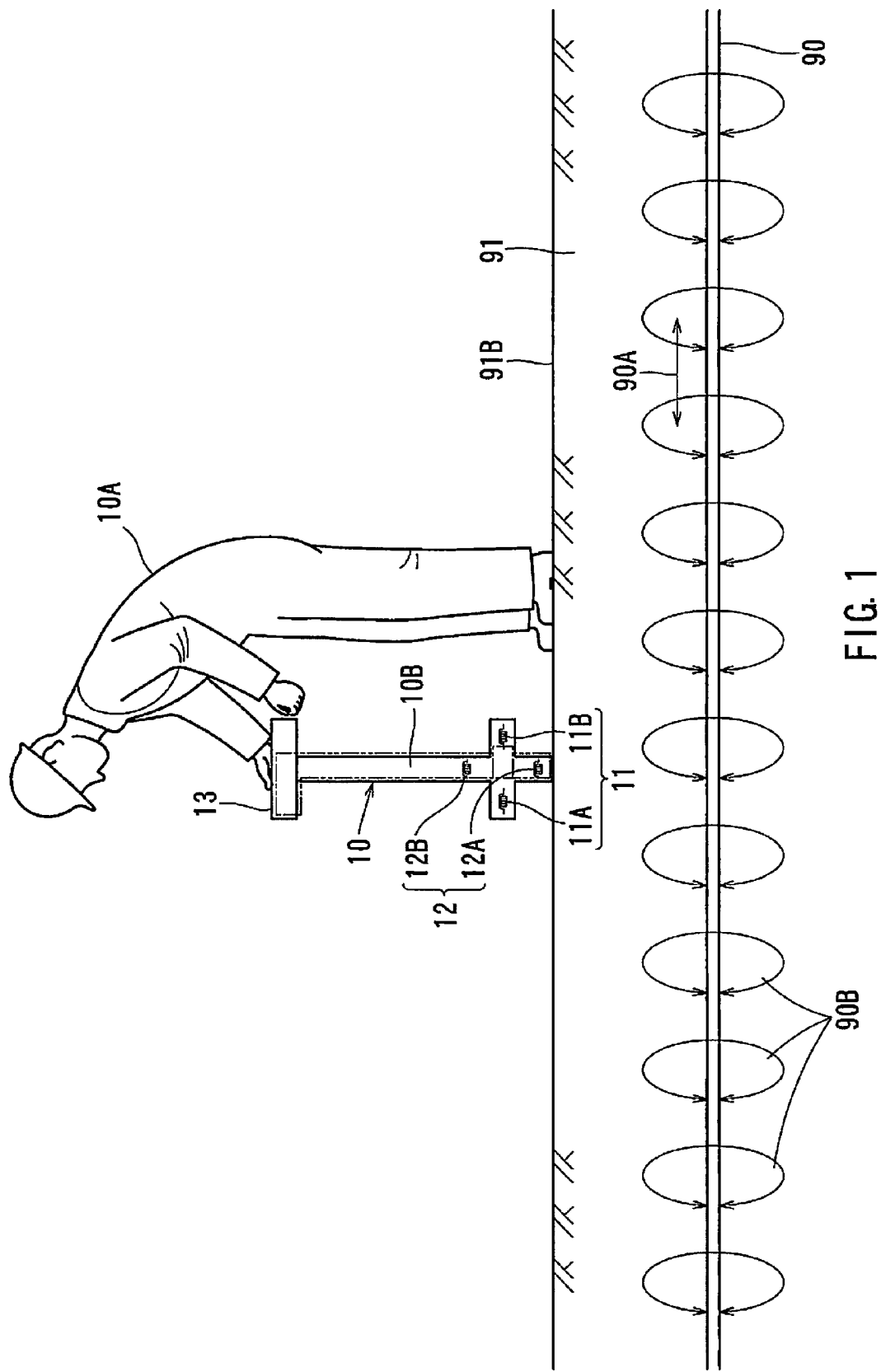
FIG. 1 is an explanatory view showing carrying out the method according to a first embodiment of the present invention.
Figure 2:
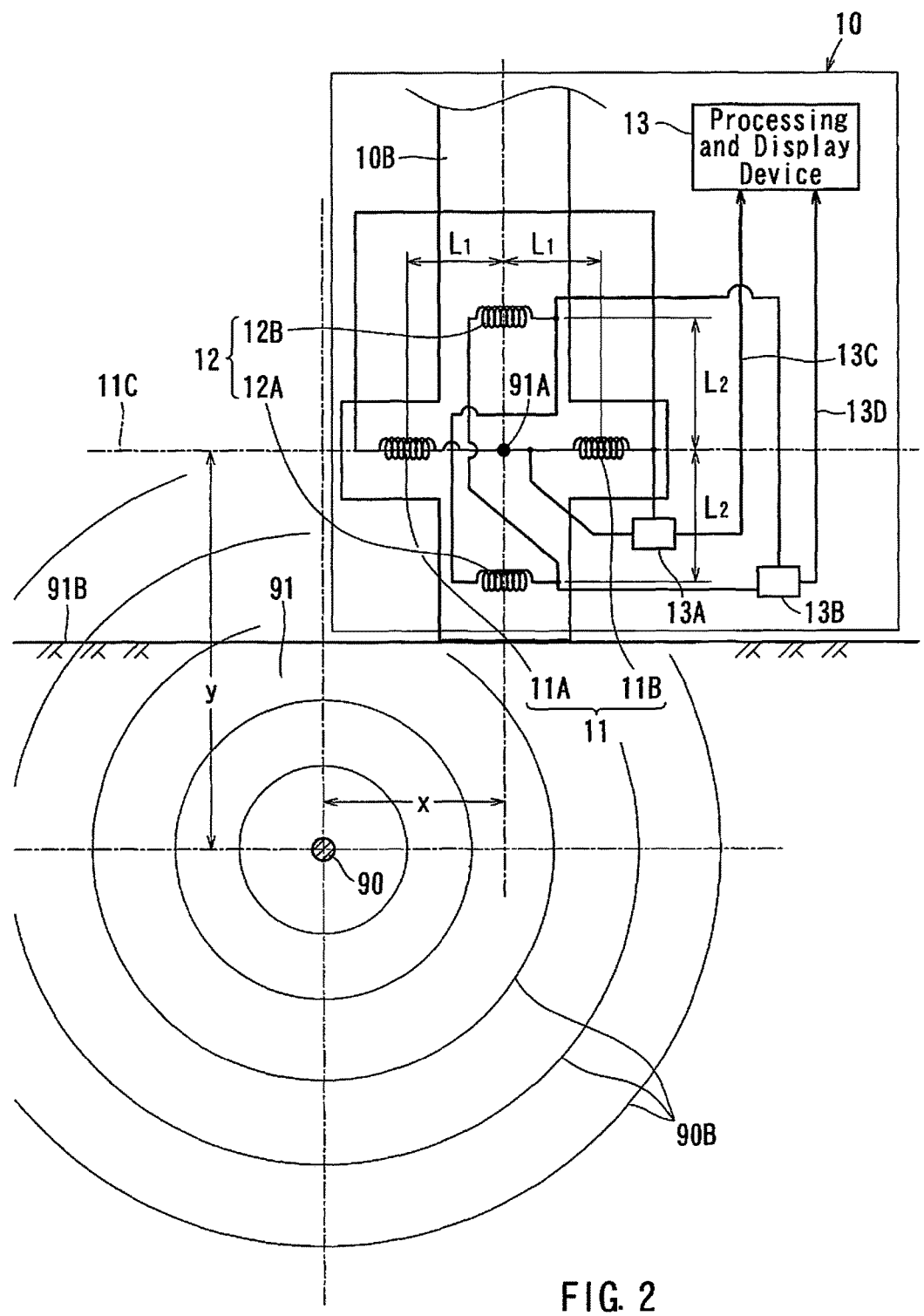
FIG. 2 is an explanatory diagram showing the positional relation between the metal cable and the cable locator in FIG. 1.

A method of locating the position of the linear object according to a first embodiment will be described with reference to FIGS. 1 to 3. As shown in FIGS. 1 and 2, in the method according to the first embodiment, the linear object to be located is a metal cable 90 that is buried in the earth 91 and generally extending along the ground surface 91B, to find the position of the metal cable 90 by means of electromagnetic line location method.

Alternating current 90A is applied in advance through the metal cable 90 in the running direction of the cable (right to left as viewed in FIG. 1). The alternating current 90A generates a circumferential alternating field 90B about the metal cable 90 (clockwise or counterclockwise direction as viewed in FIG. 2). The alternating current 90A can be produced through the metal cable 90 by using any appropriately selected known method. For example, using an alternating field generator placed near a possible location of the buried metal cable 90 to transmit alternating field to the metal cable 90 to generate induced current through the metal cable 90 is possible. Alternatively, directly applying alternating current to any part of the metal cable 90 that is exposed above the ground is also possible.

On the ground, the operator 10A locating the metal cable 90 activates a cable locator 10 to start location of the metal cable 90. The cable locator 10 is a mobile receiver unit for detecting the electromagnetic location of a linear object (e.g., metal cable 90) that is buried within a known range of depth (e.g. a range of 1 to 10 meters). The cable locator 10 may include two coil pairs 11 and 12 that generate induced voltage (or electromotive force) in the alternating field 90B, and a processor and display device 13 for processing data 13C and 13D of the induced voltage in the two coil pairs 11 and 12 (see FIG. 2) and then displaying the result for the operator 10A.

As shown in FIG. 1, the two coil pairs 11 and 12 may be arranged in the same plane and may be fixed on one side of the mounting plate 10B which extends down from the processor and display device 13 of the cable locator 10. In the following description, the side of the mounting plate 10B with the coil pairs 11 and 12 fixed (i.e. the shown side in FIG. 2) will be considered as the front side of the cable locator 10 for convenience sake.

As shown in FIG. 2, the first coil pair 11 may be composed of two individual coils 11A and 11B that are differentially connected so that the resultant terminals of the coil pair will output the difference of the voltages that are induced in the respective individual coils. For example, the two individual coils 11A and 11B have substantially the same inductive properties and the same winding direction, and are aligned on the same axis 11C and spaced apart from each other. The distance between the two individual coils 11A and 11B may preferably be significantly less (e.g. 0.4 m) than the possible depth of the buried object that is to be located by the cable locator 10. The individual coils 11A and 11B are then connected in series to form a closed circuit, and a voltmeter 13A is connected in parallel with either individual coil 11B of the coil pair. The voltmeter 13A measures the voltage due to the gradient of alternating field 90B, which appears across the individual coil 11B. The voltmeter 13A then sends the measured voltage data 13C to the processor and display device 13.

Similarly, the second coil pair 12 may be composed of a third individual coil 12A and a fourth individual coil 12B that are differentially connected. The individual coils have substantially the same inductive properties, the same winding direction, and are arranged to their respective sides of the axis 11C. They are spaced apart from each other and located on a line perpendicular to the axis 11C (i.e. in the vertical direction as viewed in FIG. 2). The distance between the two individual coils 12A and 12B may preferably be significantly less (e.g. 0.4 m) than the possible depth of the buried linear object that is to be located by the cable locator 10. The two individual coils 12A and 12B are then connected in series to form a closed circuit, and a voltmeter 13B is connected in parallel with one of the two individual coils 12A and 12B. The voltmeter 13B measures the voltage due to the gradient of the alternating field 90B, which appears across the individual coils 12B, and then sends the measured voltage data 13D to the processor and display device 13.

The third and fourth individual coils 12A, 12B, are fixed at the same distance from, but at opposite sides from, a point on the axis 11C (the measurement point 91A as in FIG. 2). The distances from each center of the first and second individual coils 11A, 11B are equal. The third and fourth individual coils 12A, 12B are arranged such that their axes are parallel to the axis 11C.

For each coil pair, the voltmeter may not necessarily be connected in parallel with the individual coils. For example, in the first and/or second coil pair, the voltmeter can be connected in series with the individual coils to form a closed circuit, and the individual coils have opposite winding directions to provide a differential connection in the coil pair. It is possible to perform electromagnetic line location of the metal cable by substantially the same process. The differential connection is also discussed in U.S. Pat. No. 3,617,865, which is incorporated herein by reference.

When performing the electromagnetic location of the metal cable 90 using the cable locator 10, the operator 10A first finds the running direction of the metal cable 90. This step may be omitted when the running direction of the metal cable 90 is already known, for example, in case of measuring the depth of the buried metal cable 90 at locations near any part of the metal cable 90 that is exposed on the ground.

As shown in FIG. 1, the determination of the running direction is done by holding the cable locator 10 in upright position on the ground surface 91B, and pivoting it horizontally while checking the induced voltage data 13D sent by the voltmeter 13B on the processor and display device 13. When the front/back direction of the cable locator 10 is not parallel to the running direction of the metal cable 90, the voltage induced by the alternating field 90B in the second coil pair 12 of the cable locator 10 will be reduced in proportion to the cosine of the deviation angle. Accordingly, the front/back direction of the cable locator 10 is matched with the running direction of the metal cable 90 when the cable locator 10 is positioned such that the largest voltage is induced in the second coil pair 12.

After having found the running direction of the metal cable 90, as shown in FIG. 2, the operator 10A directs the front/back sides of the cable locator 10 to the running direction of the cable 90 (toward the far/near side as in FIG. 2). The operator 10A (not shown in FIG. 2) then moves the cable locator 10, while maintaining its front/back sides matched to the running direction of the metal cable 90, to position the midpoint between the centers of the individual coils 11A, 11B of the first pair at a desired measurement point 91A on the ground surface 91B.

Through this process, the first coil pair 11 is positioned such that the two individual coils 11A and 11B are situated to the right and left of the measurement point 91A, as shown in FIG. 2. The first coil pair 11 outputs an induced voltage according to the horizontal component of the alternating field 90B as seen in FIG. 2 (hereinafter referred to as "X-direction"). The second coil pair 12 is positioned such that the two individual coils 12A and 12B are situated right above and below the measurement point 91A, as viewed in FIG. 2. The second coil pair 12 outputs an induced voltage according to the vertical component of the alternating field 90B as seen in FIG. 2 (hereinafter referred to as "Y-direction").

After having arranged the two pairs of coils, the operator 10A then switches the cable locator 10 into a mode for estimation of the direction in which the metal cable 90 lies with reference to the measurement point 91A. In this mode, the processor and display device 13 in the cable locator 10 starts the acquisition of data 13C and 13D of the voltage induced in the two coil pairs 11 and 12. From the acquired data 13C, 13D, the processor and display device 13 then obtains the voltages, which may be the effective values $E_1$ and $E_2$ or other representative values of the alternating voltages, that are induced by the alternating field 90B in the respective first and second coil pairs 11.

Each coil pair 11, 12, which each has two spaced coils that are differentially connected, can reduce noise on the induced voltage due to environmental magnetic field which generally has a smaller gradient than that of the target alternating field 90B. This can reduce the influence of the noise on the first and second voltages $E_1$, $E_2$ to improve the estimation accuracy of the direction in which the metal cable 90 exists as seen from the measurement point 91A.

After having obtained the first and second voltages $E_1$, $E_2$, the processor and display device 13 performs data processing according to Equation 1 below to calculate the distance ratio x/y as shown in FIG. 2. The processor and display device 13 then displays the calculated distance ratio x/y for the operator 10A.

$$\frac{E_1}{E_2} = 2n\frac{x}{y}, \quad \text{(Equation 1)}$$

where x and y are the distances from the measuring point 91A to the metal cable 90 as measured in the X-direction (horizontally in FIG. 2) and in the Y-direction (vertically in FIG. 2), respectively, and n is a certain constant.

After confirming the distance ratio x/y displayed in the processor and display device 13, the operator 10A shifts the measurement point 91A in the X-direction (horizontally as shown in FIG. 2), and repeats the steps subsequent to the coil positioning to fund a point where the distance ratio x/y becomes 0. The operator 10A can determine the metal cable 90 buried just below the point where the distance ratio x/y becomes 0 (i.e. somewhere in the Y-direction in the ground 91). Since the point at which the distance ratio x/y is 0 is located right above the metal cable 90, the point will be referred to hereinafter as "right-above point".

Having located the right-above point, the operator 10A then re-sets the measurement point 91A at the point which is shifted from the right-above point by a certain distance x in the X-direction (a horizontal distance in FIG. 2), and obtains the distance ratio x/y corresponding to the new measurement point 91A. Now with the ratio x/y and the distance x, the operator 10A can calculate the distance y to thereby obtain the depth of the buried metal cable 90.

In electromagnetic location of the metal cable 90, the method described above allows for the estimation of the direction in which the metal cable 90 is located as viewed from the measurement point 91A without tilting the coil pairs 11, 12 of the cable locator 10. This facilitates the derivation of the position of the metal cable 90, since there is no need for tilting the cable locator at various angles by trial and error in order to find the direction of the metal cable 90.

The processor and display device 13 of the cable locator 10 may be configured with an additional mode for calculating the Y-direction distance y in case that the distance x from the right-above point to the measurement point 91A is already known. Prior to using the Y-distance calculating mode, the operator 10A takes steps to obtain the distance ratio x/y at the measurement point 91A using the cable locator 10. The operator 10A then switches the cable locator 10 into the Y-distance calculation mode, and enters the known distance x from the right-above point to the measurement point 91A in the processor and display device 13 of the cable locator 10. Receiving the input, the processor and display device 13 executes processing according to the following Equation 2 to calculate the distance y, and displays the calculated distance y for the operator 10A.

$$\frac{E_1}{E_2} = 2n\frac{x}{y} + ax. \quad \text{(Equation 2)}$$

In Equation 2, value x is the distance from the measurement point 91A to the metal cable 90 as measured in the X-direction (shown horizontally in FIG. 2), which is the same as that entered in the processor and display device 13 as the distance x from the right-above point to the measurement point 91A. Value n is the same constant as in Equation 1. Value a is a certain coefficient for correcting the error contained in the ratio of first to second coil pair voltages $E_1/E_2$ that has been obtained in the way described above.

The following provides an explanation for the basis for Equations 1 and 2. The influence of noise in each parameter are considered as negligible in the following discussion.

When the first coil pair 11 is positioned as shown in FIG. 2, the effective value of the alternating voltage $e_0$ that is induced by the alternating field 90B in the first individual coil 11A of the first pair can be obtained by the following Equation 3.

$$e_0 = \frac{ik_1 y}{(x - L_1)^2 + y^2}, \quad \text{(Equation 3)}$$

where x and y are the distance x and distance y as shown in FIG. 2, respectively; i is the effective value of the alternating current 90A that generates the alternating field 90B; value $k_1$ is a proportionality constant depending on the inductive properties of the first individual coil 11A and the spatial permeability; and value $L_1$ is the distance between the measurement point 91A and the first individual coil 11A.

When the first coil pair 11 is positioned as shown in FIG. 2, the effective value of the alternating voltage $e_1$ that is induced by the alternating field 90B in the second individual coil 11B is obtained according to Equation 4 below.

$$e_1 = \frac{ik_1 y}{(x + L_1)^2 + y^2}, \quad \text{(Equation 4)}$$

where values x, y and i are the same parameters as in Equation 3; $k_1$ is a proportionality constant depending on the inductive properties of the second individual coil 11B and the spatial permeability, which has the same value as in Equation 3; and value $L_1$ being the distance between the measurement point 91A and a second individual coil 11B. This value for $L_1$ has the same value as $L_1$ in Equation 3.

According to Equations 3 and 4, the effective value of the voltage (first voltage $E_1$) induced in the first coil pair 11 (with the individual coils 11A and 11B differentially connected) is obtained by Equation 5 below.

$$E_1 = e_0 - e_1 = \frac{4ik_1L_1xy}{((x+L_1)^2 + y^2)((x-L_1)^2 + y^2)}. \quad \text{(Equation 5)}$$

As already mentioned above, the distance of the two individual coils 11A and 11B (i.e. $2L_1$) may be significantly less than the depth of the buried linear object that is to be located by the cable locator 10. It can then be assumed that the condition y>>$L_1$ is satisfied in Equation 5, and Equation 5 can be replaced by an approximation of Equation 6 below.

$$E_1 = \frac{4ik_1L_1xy}{(x^2 + y^2)^2}. \quad \text{(Equation 6)}$$

When the second coil pair 12 is positioned as shown in FIG. 2, the effective value of the alternating voltage e2 induced by the alternating field 90B in the third individual coil 12A is obtained by Equation 7 below.

$$e_2 = \frac{ik_2(y - L_2)}{x^2 + (y - L_2)^2}, \quad \text{(Equation 7)}$$

where values x, y and i are the same parameter as in Equation 3; $k_2$ is a proportionality constant depending on the inductive properties of the third individual coil 12A and the spatial permeability; and value $L_2$ is the distance from the measurement point 91A to the third individual coil 12A.

When the second coil pair 12 is positioned as in FIG. 2, the effective value of the alternating voltage $e_3$ induced by the alternating field 90B in the fourth individual coil 12B can be derived by the following equation 8.

$$e_3 = \frac{ik_2(y + L_2)}{x^2 + (y + L_2)^2}, \quad \text{(Equation 8)}$$

where values x, y and i are the same parameters as in Equation 3. Value $k_2$ is a proportionality constant depending on the inductive properties of the fourth individual coil 12B and the spatial permeability, which has the same value as $k_2$ in Equation 7. Value $L_2$ is the distance of that and measurement point 91A and the fourth individual coil 12B, which has the same value as $L_2$ in Equation 7.

According to Equations 7 and 8, the effective value of the voltage induced in the second coil pair 12 with the individual coils 12A and 12B differentially connected (second voltage $E_2$) can be calculated by the following Equation 9.

$$E_2 = e_2 - e_3 = \frac{2ik_2L_2(y^2 - x^2 - L_2^2)}{(x^2 + (y + L_2)^2)(x^2 + (y - L_2)^2)}. \quad \text{(Equation 9)}$$

As already described above, the distance between the two individual coils 12A and 12B (i.e. $2L_2$) may be significantly less than the depth of the buried linear object to be located by the cable locator 10. It can then be considered that the conditions y>>$L_2$ holds in Equation 9, and Equation 9 is replaced by the following Equation 10.

$$E_2 = \frac{2ik_2L_2(y^2 - x^2)}{(x^2 + y^2)^2}. \quad \text{(Equation 10)}$$

According to Equations 6 and 10, the ratio of the first to second coil pair voltages $E_1/E_2$ is obtained by Equation 11 below.

$$\frac{E_1}{E_2} = 2\left(\frac{k_1L_1}{k_2L_2}\right)\left(\frac{xy}{y^2 - x^2}\right) = \frac{2n}{\left(\frac{y}{x} - \frac{x}{y}\right)}, \quad \text{(Equation 11)}$$

where value n is equal to $k_1L_1/k_2L_2$. This value n can be preset as a constant value during the manufacture of the cable locator 10. It can be determined by the distances of each pair of the spaced coils 11A and 11B; 12A and 12B, the inductive properties of the coils 11A, 11B, 12A and 12B, and the permeability of the environmental space.

It can be considered that the condition y>>x is satisfied both when finding a point right above the cable 90 and when the measurement point 91A is set near the right-above point. Accordingly, Equation 11 can be approximated assuming y>>x, deriving Equation 1 already mentioned above.

If y>>x cannot be considered to hold, it may be assumed that the distance ratio x/y calculated by Equation 1 may contain some error due to an effect of the term "-x/y" present in the denominator of Equation 11. The inventor then conducted a simulation test to evaluate the effect of the term "-x/y". The simulation test involved calculating the distance ratio x/y according to each of Equations 1 and 11 while varying each parameter mentioned above to the various values, and obtaining the percentage of the error contained in the distance ratio x/y calculated by Equation 1 with reference to the distance ratio x/y calculated by Equation 11 (hereinafter also referred to as the "relative error").

Figure 3:
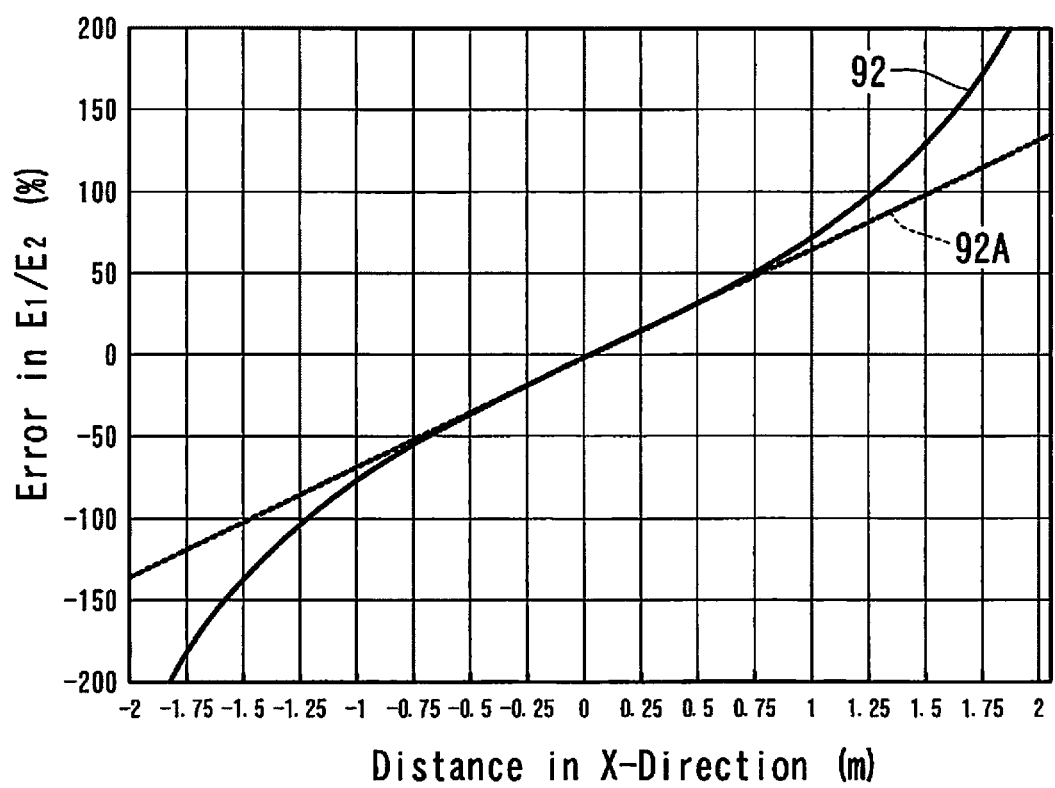
FIG. 3 is a chart of the percentage of error in the calculation of the method according to the first embodiment of the present invention.

FIG. 3 shows the results of an exemplary simulation test. FIG. 3 is the chart showing the change of the relative error 92 when letting n=1, y=3 m and $L_1=L_2$=0.2 m, and varying x from −2 to 2 m. The sign of x is arbitrarily defined to indicate which side of the point right above the metal cable 90 the measurement point 91A is located. According to the chart of FIG. 3, it can be seen that within the range of −0.8 m≤x≤0.8 m, the change in the relative error 92 is substantially equal to the approximation 92A that is in proportion to x. In addition, this result will not change in quality if the parameters are changed in another simulation test. For example, when letting y=1 m and $L_1=L_2$=0.2 m, and changing x from −0.8 to 0.8 m, the deviation of the relative error from its proportional approximation is ±12% at maximum. For another example, when letting y=2 m and $L_1=L_2$=0.2 m, and changing x from −1.6 to 1.6 m, the change in the relative error deviation between the proportional approximation for the relative error is ±3% at maximum.

According to the simulation tests, it may be said that approximate proportion holds between the error contained in the voltage ratio $E_1/E_2$ and the distance x. Hence, it can be seen that the calculated distance ratio x/y will have a reduced error if Equation 2 mentioned above is used instead of Equation 1 as an approximation of Equation 11.

In addition, Equation 2 may also be used when the distance x is already known in order to obtain the distance y. It is possible by a simple calculation to calculate and correct the error included in the distance ratio x/y, thereby improving accuracy of estimation of the direction of the metal cable 90 with respect to the measurement point 91A and of the Y-direction distance y.

Figure 4:
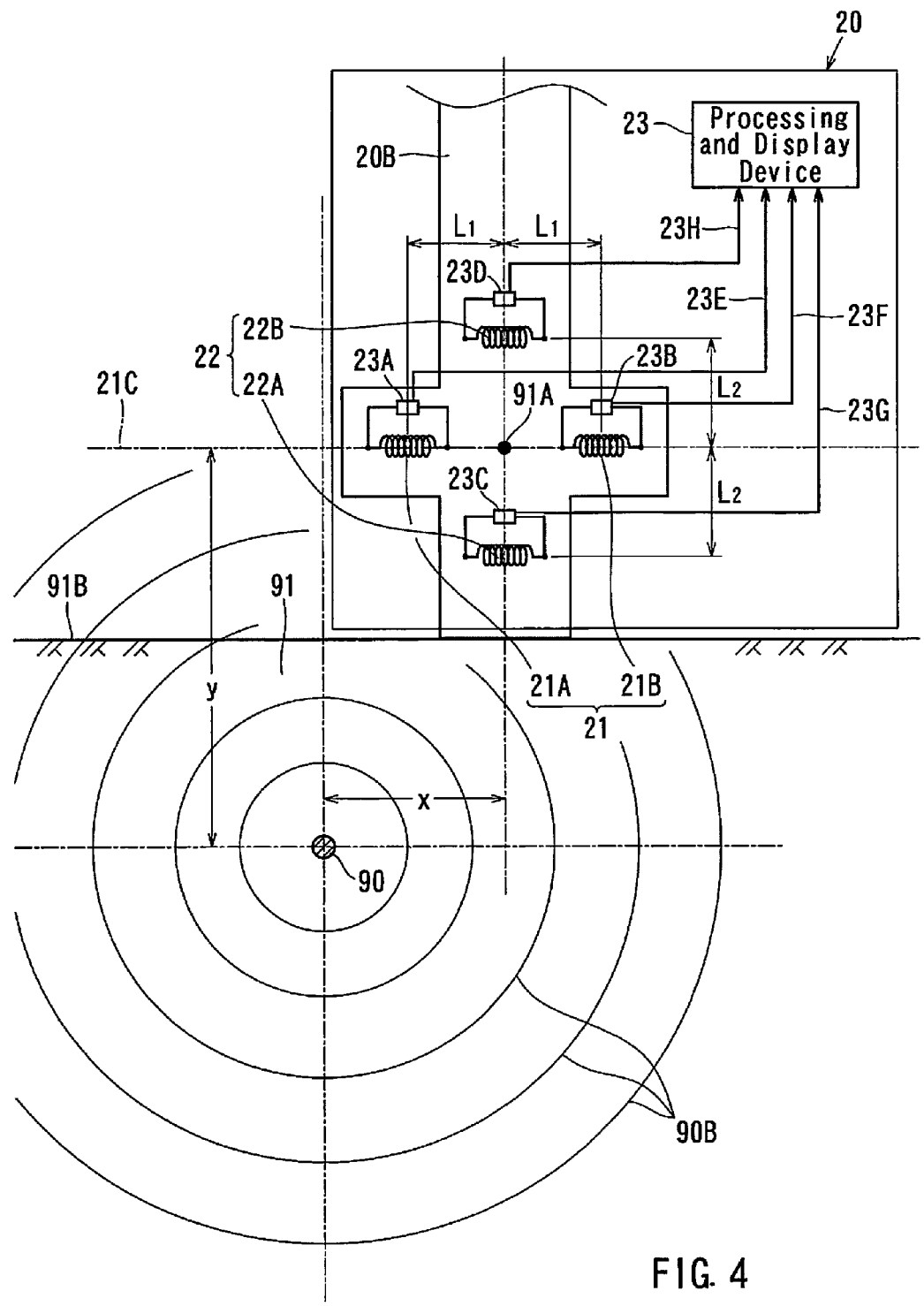
FIG. 4 is an explanatory view showing the running method according to a second embodiment of the present invention.

Now a method of locating linear objects in a second embodiment will be described with reference to FIGS. 4 to 7. As shown in FIG. 4, in the second embodiment, the method uses a differently configured cable locator 20 instead of the one in the first embodiment to perform location of the metal cable 90. The cable locator 20 has an equivalent of differentially connected coils implemented within the processor and display device 23. The elements of the cable locator 20 that corresponds to those in the first embodiment will have similar reference numerals affixed in the drawings, and detailed descriptions of them will be omitted. The definition of the X- and Y-directions in the first embodiment can be incorporated in the following description of the second embodiment.

The first coil pair 21 of the cable locator 20 is provided with output elements 23A, 23B that are connected to the respective individual coils 21A, 21B and output the voltage induced in the respective coils 21A, 21B to the processor and display device 23 (see the induced voltage 23E, 23F in FIG. 4). Similarly, the second coil pair 22 of the cable locator 20 is provided with output elements 23C, 23D that are connected to the respective individual coils 22A, 22B, and output the voltage induced in the respective coils 22A, 22B to the processor and display device 23 (see the induced voltage 23G, 23H in FIG. 4).

The processor and display device 23 of the cable locator 20 performs differential processing on the input voltages 23E, 23F, 23G, 23H from each output elements 23A, 23B, 23C, 23D, to obtain the voltage $E_1$ for the first coil pair 21 and the voltage $B_2$ for the second coil pair 22. The differential processing may be either analog, using operational circuitry, or digital, involving subtraction of quantized values of the input voltages 23E, 23F, 23G and 23H. The cable locator 20 may also be configured with a function to calculate and display the distance ratio x/y from the input voltages $E_1$ and $E_2$, in addition to the function to calculate the Y-distance as described above. These functions may be the same as those in the first embodiment described above.

The cable locator 20 may also be configured to realize a function to obtain the X-distance and the Y-distance from the distance ratio x/y at a single measurement point when the condition y>>x can be assumed to hold at the measurement point. More specifically, in the first step, the distance y from the measurement point 91A to the metal cable 90 is obtained only from the voltage induced in the coil pairs 21, 22 at a single measurement point 91A. In the next step, the distance x from the measurement point 91A to the metal cable 90 is obtained from the distance y determined in the previous step. Only the first step of obtaining Y-distance may allow for easier location of the position of the metal cable 90 (i.e. the distances x and y). The two steps in combination enables to locate the position of the metal cable 90 based on only the measurement results at a single measurement point 91A.

In the first step in obtaining the Y-distance, the processor and display device 23 of the cable locator 20 acquires the induced voltages 23E, 23F, 23G, 23H from each output elements 23A, 23B, 23C, 23D, and calculates the voltage ratio $E_1/E_2$, that is, the ratio of the first coil pair voltage $E_1$ to the second coil pair voltage $E_2$. From the acquired voltages 23G and 23H, the device 23 obtains the effective values $e_2$ and $e_3$, or other representative values, of third and fourth coil voltages that are induced by the alternating field 90B in the third and fourth individual coils 22A and 22B, respectively.

The processor and display device 23 next calculates the Y-distances corresponding to the obtained third and fourth coil voltages $e_2$, $e_3$ by processing according to the following Equation 12 on the assumption that the X-distance is 0.

$$Y = \frac{2L_2 e_3}{e_2 - e_3} + L_2, \qquad \text{(Equation 12)}$$

where Y is the Y-distance to be calculated, and the symbol is indicated in upper case in order to clarify that it is the value when the X-distance is assumed to be 0. The values $e_2$ and $e_3$ are the third and fourth coil voltages, respectively. The value $L_2$ is the distance from the measurement point 91A to the third and fourth individual coils 22A, 22B (see FIG. 4). The value of $L_2$ is stored in advance in the storage medium (not shown) of the processor and display device 23.

Having calculated the Y value, the processor and display device 23 performs a processing according to Equation 13 below based on the ratio of the first to second coil pair voltages $E_1/E_2$ to correct the Y value to the distance y in consideration of the influence of the distance x. The corrected distance y, which is the result of the first step of obtaining Y-distance mentioned above, may be displayed on the processor and display device 23 for the operator.

$$Y = y\left(1 + \frac{\left(\frac{E_1}{E_2}\right)^2}{2n^2}\right), \qquad \text{(Equation 13)}$$

where y is the corrected value of the Y-distance to be calculated, and Y is the original Y-distance that has already been obtained. The values $E_1$ and $E_2$, respectively, are the first and second coil pair voltages as described above. The value n is a factor that is used in the processing according to Equation 1 to calculate the distance ratio x/y from the voltage ratio $E_1/E_2$, and has the same value of n used in calculation of the distance ratio x/y.

In the second step of obtaining the X-distance, the processor and display device 23 of the cable locator 20 uses the corrected distance y from the first step described above. The processor and display device 23 then performs a processing according to Equation 14 below based on the voltage ratio $E_1/E_2$ and the corrected distance y, to calculate the distance x. The respective parameters in Equation 14 are the same as those in Equation 13, except for the distance x that is to be calculated.

$$x = \frac{y}{2n} \cdot \left(\frac{E_1}{E_2}\right). \qquad \text{(Equation 14)}$$

The corrected distance x, which is the result of this second step, is displayed on the processor and display device 23 for the operator (not shown).

Next, the meaning of Equations 12 and 14 will be explained. In the following discussion, the influence of noise in each parameter will be assumed to be negligible.

As shown in FIG. 4, when the distance x is assumed to be zero, the effective value of the voltage induced by the alternating field 90B in the third individual coil 22A (the third coil voltage $e_2$) can be obtained by the following Equation 15.

$$e_2 = \frac{ik_2}{Y - L_2}, \quad \text{(Equation 15)}$$

where Y is the Y-distance such that the effective value of the induced voltage in the third individual coil 22A equals the third voltage $e_2$ when the distance x is assumed to be zero, it is shown in upper case in order to clarify that it is the value when the X-distance is assumed to be zero. The value i is the effective value of the alternating current 90A that generates the alternating field 90B. The value $k_2$ is a proportionality constant depending on the inductive properties of the third individual coil 22A and the spatial permeability. The value $L_2$ is the distance from the measurement point 91A to the third individual coil 22A.

When the distance x as shown in FIG. 4 is regarded as zero, the effective value of the voltage that is induced by the alternating field 90B in the fourth individual coil 22B (the fourth coil voltage $e_3$) can be obtained by the following Equation 16. The parameters in Equation 16 are the same ones as those in Equation 15, except for the fourth voltage $e_3$.

$$e_3 = \frac{ik_2}{Y + L_2}. \quad \text{(Equation 16)}$$

Equations 15 and 16 can be simultaneously solved by modifying them to eliminate the parameters $k_2$ and i, deriving Equation 12 already mentioned. Note that the above Equation 12 is the exact expression of value Y as expressed using parameters $e_2$, $e_3$ and $L_2$.

If the distance x as in FIG. 4 is not assumed to be 0, the effective value of the voltage induced by the alternating field 90B in the third individual coil 22A (the third voltage $e_2$) can be calculated by the following Equation 17.

$$e_2 = \frac{ik_2(y - L_2)}{x^2 + (y - L_2)^2}, \quad \text{(Equation 17)}$$

where x and y are the X-distance x and the Y-distance y as shown in FIG. 4, respectively; value i is the same one as in Equation 15; value $k_2$ is a proportionality constant depending on the inductive properties of the third individual coil 22A and the spatial permeability, and is the same parameter $k_2$ in Equation 15; value $L_2$ is the distance between the measurement point 91A and third individual coil 22A, and is the same one in Equation 15.

If it is assumed that the distance x is not equal to 0, as shown in FIG. 4, the effective value of the induced voltage of the alternating field 90B is to generate the fourth individual coil 22B (the fourth voltage $e_3$) can be derived by the following Equation 18.

$$e_3 = \frac{ik_2(y + L_2)}{x^2 + (y + L_2)^2}, \quad \text{(Equation 18)}$$

where x, y are the same parameters as in Equation 17, respectively; and value i is the same parameter as in Equation 15. Value $k_2$ is a proportionality constant depending on the inductive properties of the fourth individual coil 22B and the spatial permeability, which has the same value as in Equation 15; and value $L_2$ is the distance from the measurement point 91A to the fourth individual coil 22B, which has the same value as in Equation 15.

Equations 12, 17 and 18 can be simultaneously solved by erasing the parameters $e_2$ and $e_3$, deriving the following Equation 19. Equation 19 is the exact expression of the value of Y as expressed using the parameters x, y and $L_2$.

$$Y = \frac{(y + L_2)(x^2 + (y - L_2)^2)}{y^2 - x^2 - L_2^2} + L_2. \quad \text{(Equation 19)}$$

In Equation 19, the distance between the third and forth individual coils 22A, 22B (i.e. $2L_2$) is shorter than the depth of the buried linear object that is to be located by the cable locator 20. Therefore, assuming that the condition $y \gg L_2$ is satisfied, Equation 19 can be replaced by an approximation as the following Equation 20.

$$Y = y\left(1 + \frac{2x^2}{y^2 - x^2}\right). \quad \text{(Equation 20)}$$

The function to obtain the Y-distance at a single measurement point works if the condition of $y \gg x$ can be assumed to be satisfied, as described above. Therefore, assuming $y \gg x$, Equation 20 can be replaced by an approximation as the following Equation 21.

$$Y = y\left(1 + 2\left(\frac{x}{y}\right)^2\right). \quad \text{(Equation 21)}$$

Equation 21 is the approximation of Y as expressed using the parameter y and the parameter ratio x/y. Equation 21, when combined with the equation that is used in calculation of the distance ratio x/y from the voltage ratio $E_1/E_2$ when the condition of $y \gg x$ holds (i.e. Equation 1), can derive the Equation 13 already mentioned. Equation 1 can be transformed to derive Equation 14.

Figure 5:
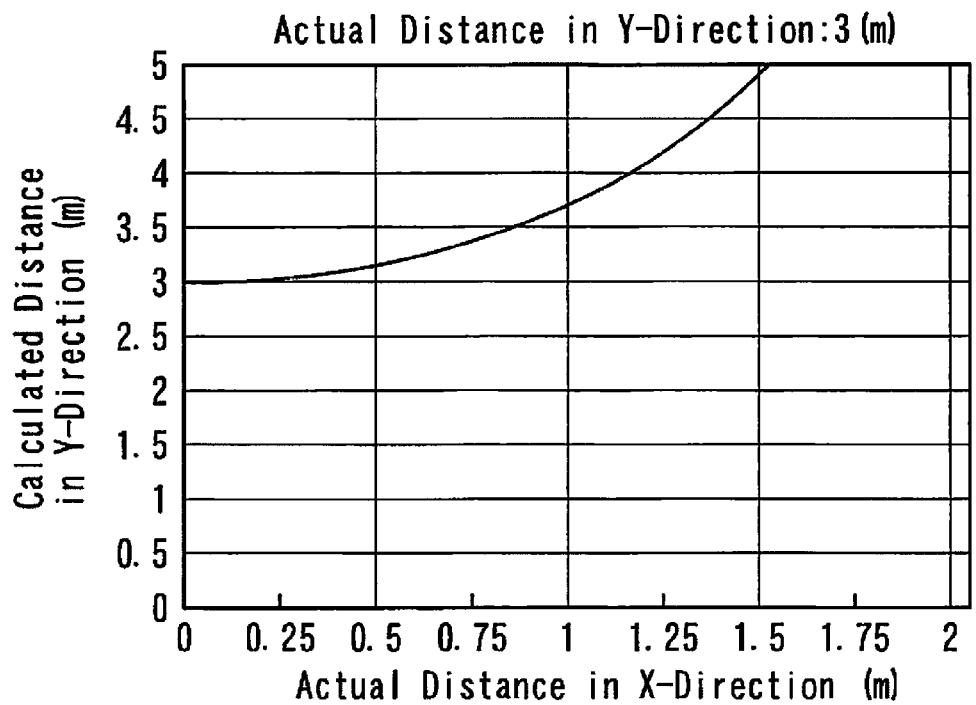
FIG. 5 is a chart of the Y-distance determined based on the method according to the second embodiment of the present invention.
Figure 6:
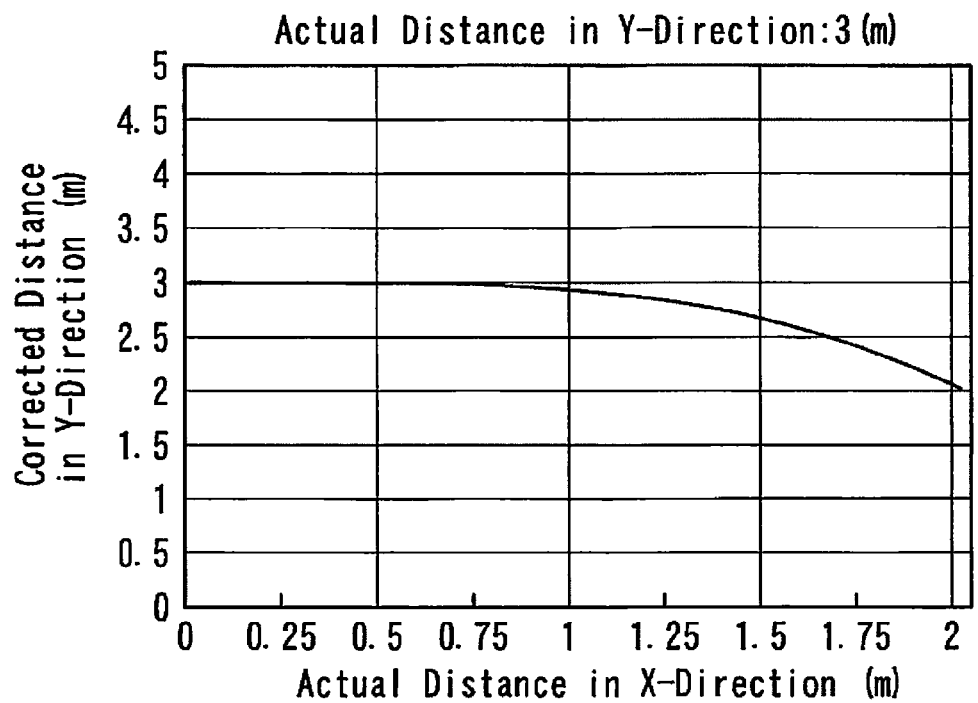
FIG. 6 is a chart of the Y-distance corrected in the method according to the second embodiment of the present invention.
Figure 7:
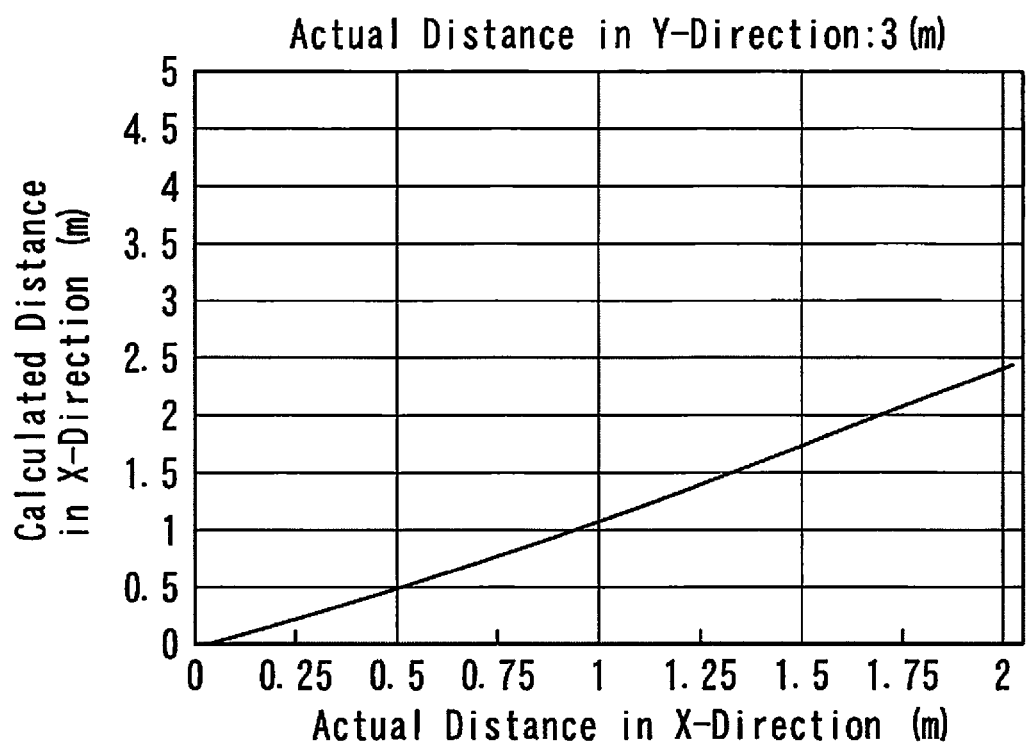
FIG. 7 is a chart of the X-distance determined based on the method according to the second embodiment of the present invention.

The inventors have conducted a simulation test to verify the validity of the process of obtaining the X-distance and Y-distance at a single measurement point. The simulation test involved examining the Y-distance Y determined according to Equation 12, the corrected distance y according to Equation 13, and the distance x calculated from the distance y according to Equation 14, while varying the parameters to the various values. FIGS. 5 to 7 shows the results of the exemplary simulation test. Specifically, FIGS. 5 to 7 shows the results obtained by letting n=1, $L_1=L_2=0.2$ m and the actual distance y=3 m, and changing the actual distance x from 0 to 2 m. FIG. 5 is a chart showing the Y-distance calculated according to Equation 12. FIG. 6 is a chart in the corrected Y-distance based on the Y-distance of FIG. 5 according to Equation 13. FIG. 7 is a chart of X-distance that was determined according to Equation 14 based on Y-distance of FIG. 6.

From the chart of FIG. 5, one can find that the Y-distance calculated while assuming the X-distance to be 0 includes an error according to the actual distance x. In addition, it can be seen from the chart of FIG. 6 that correcting the Y-distance suppresses the error according to the actual distance x. According to the chart of FIG. 7, it can be seen that the calculated X-distance is well correlated to the actual distance x. In conclusion, the results may be said to show the validity of the function of obtaining the X-distance and Y-distance at the single measurement point.

Figure 8:
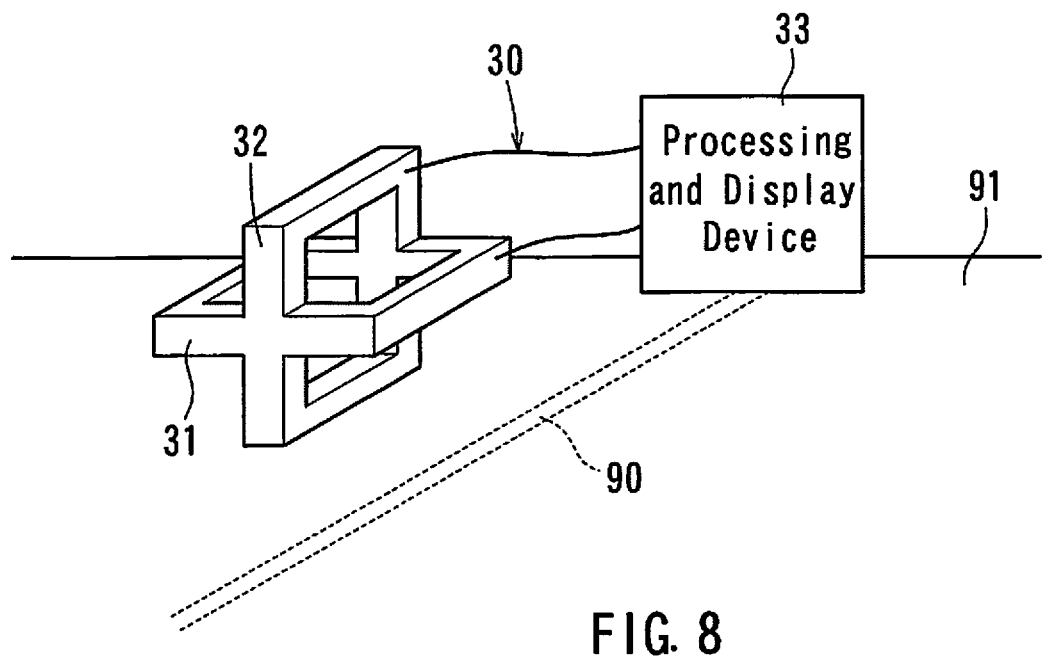
FIG. 8 is an explanatory view showing a state in which the running method according to a third embodiment of the present invention.

Now, the method in a third embodiment will be described with reference to FIG. 8. As shown in FIG. 8, the method in the third embodiment uses yet another differently configured cable locator 30 to obtain the position of the metal cable 90 in substantially the same way.

The cable locator 30 has two single coils 31, 32 in place of the two coil pairs 11, 12 of the first embodiment, respectively. With regard to the elements of the cable locator 30 that are common to the first embodiment, their detailed description will be omitted. The definition of the X- and Y-directions in the first embodiment may be incorporated in the description of the third embodiment.

Figure 9:
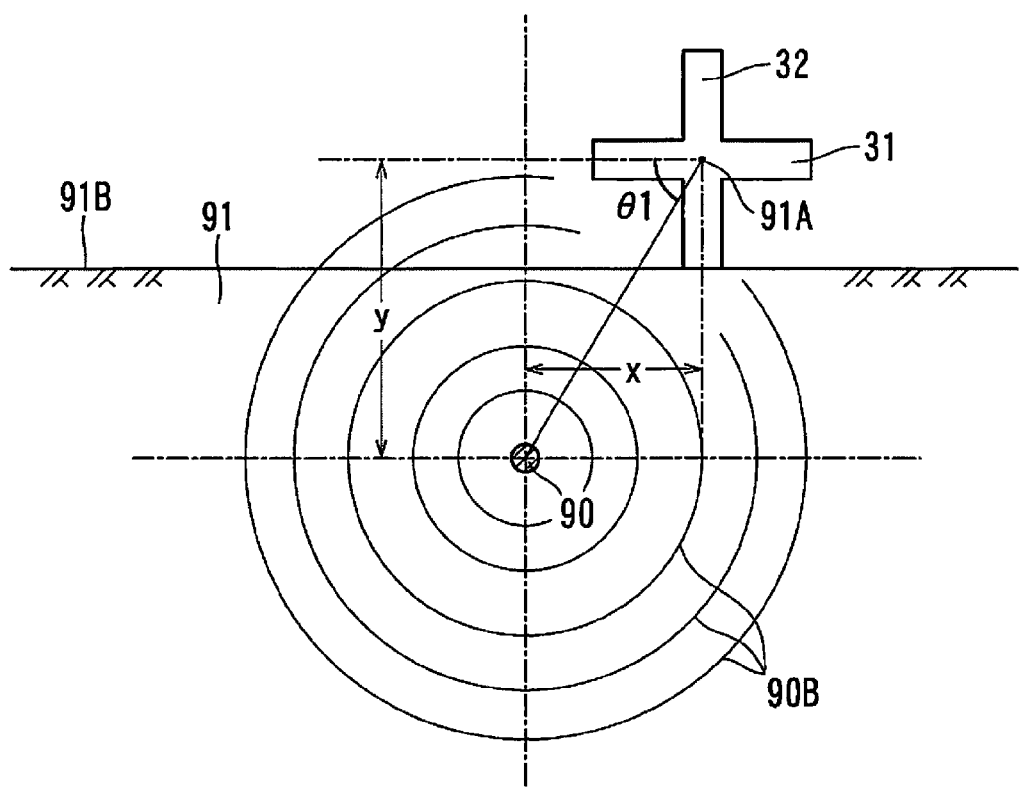
FIG. 9 is an explanatory diagram showing the positional relation between the metal cable and the cable locator in FIG. 7.
Figure 10:
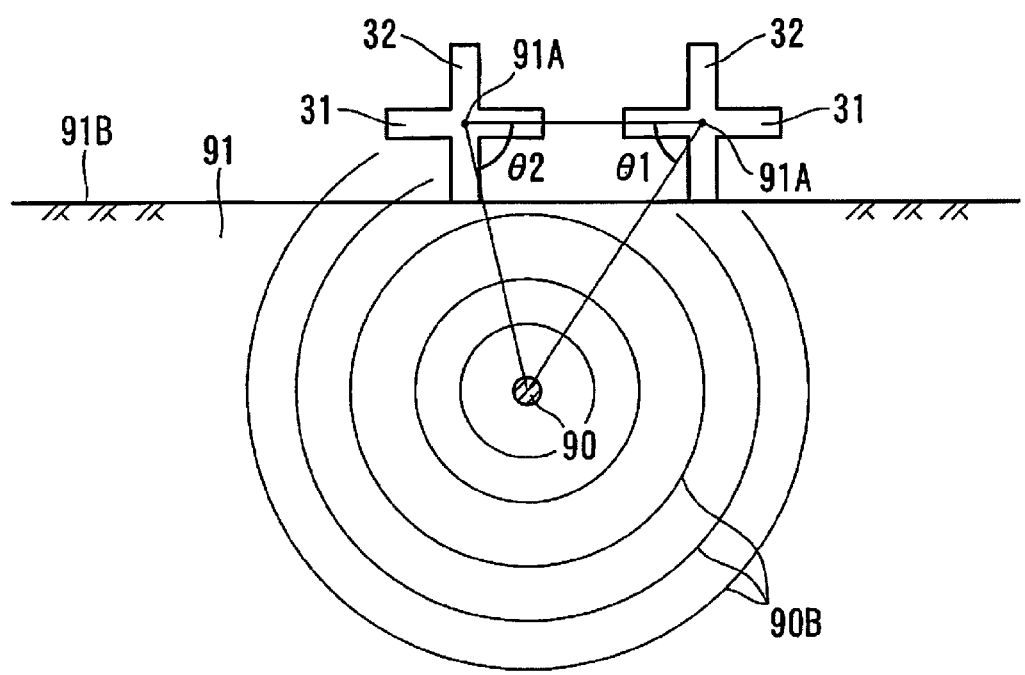
FIG. 10 is an explanatory diagram for explaining the principle for obtaining the position of the metal cable by the method according to the third embodiment of the present invention.

As shown in FIGS. 8 to 10, the two coils 31, 32 are combined such that their axes are orthogonal. As shown in FIG. 8, the two coils 31, 32 are respectively connected to the processor and display device 33, which measures and processes the induced voltage that is generated in each coil 31, 32, and then displays the processing results for the operator (not shown in FIG. 8). As shown in FIGS. 9 and 10, the two coils 31, 32 are arranged around the measurement point 91A such that the axis of the second coil 32 is matched to the X-direction (horizontal direction as shown) and the axis of the first coil 31 is matched with the vertical direction (i.e. the Y-direction).

Whether the axis of the second coil 32 is matched in the X-direction can be determined by examining the voltage induced in the second coil 32 by the circumferential alternating field 90B that is generated about the metal cable 90 (clockwise or counterclockwise as viewed in FIG. 9). Specifically, when the axis of the second coil 32 is offset from the X-direction, the voltage induced by the alternating field 90B in the second coil 32 is reduced in proportion to the cosine of the deviation angle. Therefore, the second coil 32 is turned in various orientations, and when the maximum induced voltage generated in the second coil 32, the axis of the second coil 32 is matched with the X-direction.

When performing location of the metal cable 90 using the cable locator 30, the operator first arranges the two coils 31 and 32 as described above. The operator then activates the processor and display device 33 of the cable locator 30 for starting an estimation of the direction in which the metal cable 90 is located as viewed from the measurement point 91A (i.e., dip angle θ1 shown in FIG. 8). In this mode, the processor and display device 33 measures the induced voltages generated in the respective coils 31 and 32. The processor and display device 33 then obtains the effective value $E_3$ and $E_4$, or other representative values, of the first and second coil voltages that are induced by the alternating field 90B in the first and second coils 31 and 32, respectively.

Subsequently, the processor and display device 33 calculates the distance ratio x/y on the assumption that the distance ratio x/y of is equal to the ratio of the first to second coil voltages $E_3/E_4$ multiplied by a predetermined coefficient. The distances x and y are the distances from the measurement point 91A to the metal cable 90 as measured in the X-direction and the Y-direction, respectively. Based on the distance ratio x/y, the processor and display device 33 then calculates the dip angle θ1 at which the metal cable 90 lies as viewed from the measurement point 91A, and displays it for the operator. Having checked the dip angle θ1 on the processing the display device 33, the operator, as shown in FIG. 10, shifts the measurement point 91A in the X-direction (horizontal direction), and repeats the steps subsequent to the coil arrangement. Now with the positions of the two measurement points and the dip angles θ1 and θ2 measured at the measurement points known, the operator can obtain the location and depth of the buried metal cable 90.

The principle of the calculation of the distance ratio x/y as described above will be explained. In the following discussion, the influence of noise on each parameter will be assumed as negligible. In the state shown in FIG. 9, the effective value of the voltage induced by the alternating field 90B in the first coil 31 (referred to as the first coil voltage $E_3$) can be obtained by the following Equation 22.

$$E_3 = \frac{ik_3 x}{x^2 + y^2}, \quad \text{(Equation 22)}$$

where x and y values are the distances x and y as also shown in FIG. 9, respectively. The value i is the effective value of the alternating current that generates the alternating field 90B. The value $k_3$ is a proportionality constant depending on the inductive properties of the first coil 31 and the spatial permeability.

Further, in the state shown in FIG. 9, the effective value of the voltage induced by the alternating field 90B in the second coil 32 (referred to as the second coil voltage $E_4$) can be obtained by the following Equation 23.

$$E_4 = \frac{ik_4 y}{x^2 + y^2}, \quad \text{(Equation 23)}$$

where values x, y and i are the same parameters as in Equation 22, and value $k_4$ is a proportionality constant depending on the inductive properties of the second coil 32 and the spatial permeability.

Equations 22 and 23 can be simultaneously solved by modifying them to eliminate the parameter i, deriving the following Equation 24.

$$\frac{E_3}{E_4} = \left(\frac{k_3}{k_4}\right)\left(\frac{x}{y}\right). \quad \text{(Equation 24).}$$

Equation 24 shows that the distance ratio x/y is identical to the ratio of the first to second coil voltages $E_3/E_4$ multiplied by a certain factor $k_4/k_3$.

In the method of locating the position of linear objects according to the present invention, the linear object to be located is not limited to a metal cable that can flow alternating current through its length to generate circumferential alternating field. The target of location may be water pipes made of metal or any other linear objects to which alternating current can be applied in the running direction for generating circumferential alternating field. However, non-conductive linear objects to which current cannot be applied are also possible to be located if the linear object is a pipe with one of the ends already known. An alternating field generator can be inserted into the pipe through that end for generating circumferential alternating field about the linear object. The objects don't have to be completely linear from end to end. It is satisfactory that at least a portion of the body of the object is linear.

The linear objects to be located is not limited to ones buried in the ground. The method of the present invention can locate linear objects placed at any location, for example, those buried in a wall or column or those concealed from the outside by some shielding objects.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

The invention claimed is:

1. A method of locating the position of a linear object, wherein a running direction of the linear object is known, the method comprising:

generating a circumferential alternating magnetic field about a linear object;

arranging a first and a second reactor around a measurement point away from the linear object, the first reactor comprising a first coil and a second coil differentially connected so that the first reactors produces a first reactor induced voltage corresponding to an X-direction field gradient of an X-direction component of the magnetic field, the X direction being perpendicular to the known running direction of the linear object, and the second reactor comprising a third coil and a fourth coil differentially connected so that the second reactor produces a second reactor induced voltage corresponding to a Y-direction field gradient of an X-direction component of the magnetic field, the Y direction being perpendicular both to the X-direction and to the running direction of the linear object, obtaining the first reactor voltage corresponding to the X-direction field gradient from the first reactor and the second reactor voltage corresponding to the Y-direction field gradient from the second reactor; and determining an estimated direction in which the linear object is located as viewed from the measurement point, by equating a ratio of an X-distance to a Y-distance and a ratio of the first reactor voltage to the second reactor voltage multiplied by a certain coefficient, wherein the X-distance is a distance from the measurement point to the linear object in the X-direction, and the Y-direction is a distance from the measurement point to the linear object in the Y-direction.

2. The method of locating the position of a linear object according to claim 1, wherein the first and second coils are spaced apart from each other, and arranged on opposite sides of the measurement point in the X-direction, wherein the third and fourth coils are spaced apart from each other, arranged on opposite sides of the measurement point in the Y-direction, and wherein the first, second, third, and fourth coils each have an axis aligned in the X-direction.

3. The method of claim 2, wherein the step of determining the estimated direction includes removing an error in proportion to the X-distance from the ratio of the first reactor voltage to the second reactor voltage.

4. The method of claim 2, further comprising:

obtaining a third coil voltage induced in the third coil by the alternating field, and a fourth coil voltage induced in the fourth coil by the alternating field;

calculating the Y-distance based on the third and fourth coil voltages while assuming the X-distance as zero; and correcting the calculated Y-distance based on the ratio of the first reactor voltage to the second reactor voltage.

5. The method of claim 4, further comprising calculating the X-distance based on the corrected Y-distance and the ratio of the first reactor voltage to the second reactor voltage.

* * * * *